Inventor:
HERBERT RUBIN

Attorney

Patented June 21, 1949

2,473,908

UNITED STATES PATENT OFFICE 2,473,908

SUPPORTING MEANS FOR BASKETBALL BASKETS

Herbert Rubin, New York, N. Y.

Application August 2, 1948, Serial No. 41,974

6 Claims. (Cl. 273—1.5)

My invention relates to supports for basketball baskets, and one of its objects is to provide a ring adapted for the suspension of a basket-ball basket with novel means holding the ring in proper horizontal position.

Other objects are to hold the basket ring optionally by one or both of two engageable and disengageable members; to provide one shield-shaped member adapted for immediate attachment to a wall and for removable attachment to the other member; to adapt the other member for removable suspension on a wall having a free upper edge, for example, on a door, and for temporary engagement with the first member, and thereby to facilitate the attachment of the support to different walls and, optionally, in easily removable or more permanent manner.

Further objects are to secure the basket ring to the shield-shaped member, to provide this member with a hollow space for receiving prongs affixed to or forming bent parts of the ring, and with lateral gaps for the passage of parts of the ring adjoining these prongs, to hold the ring in the secured position as long as the shield is not disengaged either from the suspension member or from an immediately affixed wall, to make unnecessary the separation of the ring and of these members when the suspension member is removed from a door or the like whereby all parts of the support can be removed as one unit, and to facilitate separation of these parts in such a manner that they can be stored or shipped in flat and not bulky condition.

Still further objects are to secure the shield against unintentional dislocation relatively to the suspension member, to provide the suspension member with projections behind which rims of the shield can slip from above, to stop excessive downward movement of these rims and of the shield, and to provide the suspension member with a stop over which the shield may slip downwardly and which prevents unintentional upward return of the shield.

Still other objects are to attain these results with simple and reliable means, and to provide a structure that can be inexpensively made.

Still other objects and advantages will appear from the following description of an exemplifying embodiment of my invention, from the appended claims and from the accompanying drawing in which:

Figure 1:
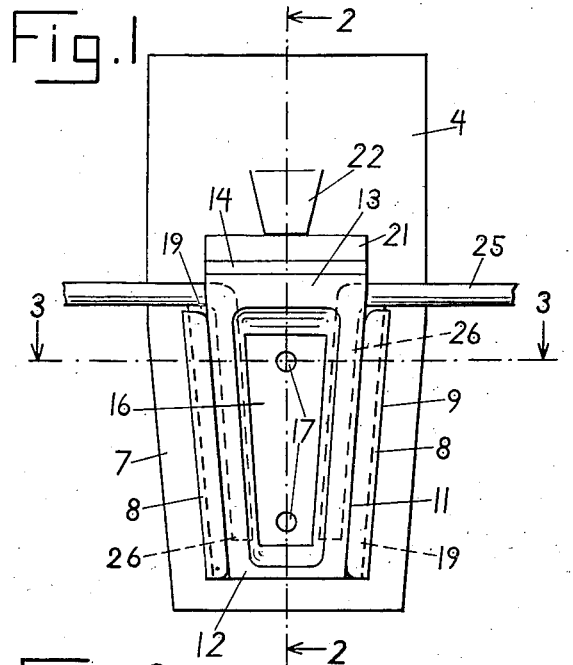
Fig. 1 shows a front view of an illustrative embodiment of my invention, the basket ring being broken off.
Figure 2:
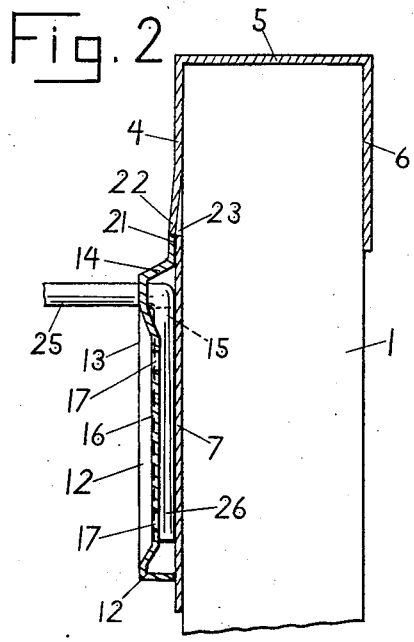
Fig. 2 shows a cross-section of this embodiment, taken along the line 2—2 in Fig. 1 and a non-sectional side view of the upper part of a door supporting the embodiment.
Figure 3:
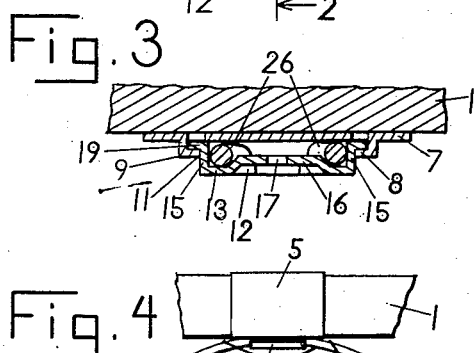
Fig. 3 shows a cross-section taken along the line 3—3 in Fig. 1.
Figure 4:
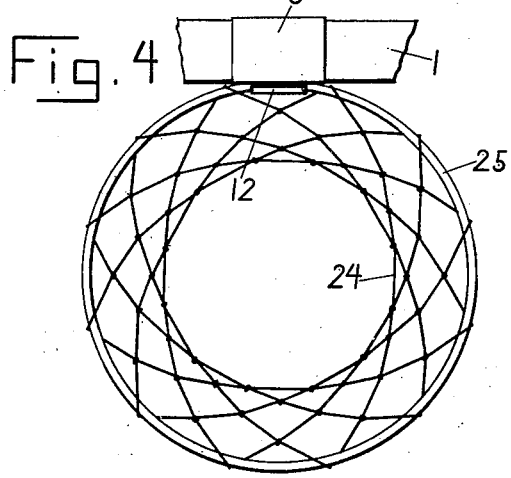
Fig. 4 shows a top view of the same embodiment represented on a considerably reduced scale.

Referring to the drawing, numeral 1 indicates a door or a similar wall-like body having a free upper edge or narrow side. A member 4 is suspended on the door 1 and engages the upper edge thereof.

The suspension member 4 comprises a top plate 5 placed on top of the door 1, a short back plate 6 and a longer front plate 7. The plates 6 and 7 extend from the plate 5 down whereby the member 4 has a vertical cross-section forming a reversed U.

Two ledges or strips 8 project from the front plate 7 to the front and extend in up-down directions at a horizontal distance from each other. Each ledge 8 may be struck out of the material of the plate 7 and has a longitudinal edge 9 connected to the plate 7. The opposite edge 11 of each ledge is free or separated from the plate 7 and is slightly spaced from this plate whereby each ledge borders a downwardly extending channel having an open side facing the channel bordered by the other ledge. Preferably the ledges 8, their channels and their longitudinal edges converge in downward directions.

Figure 5:
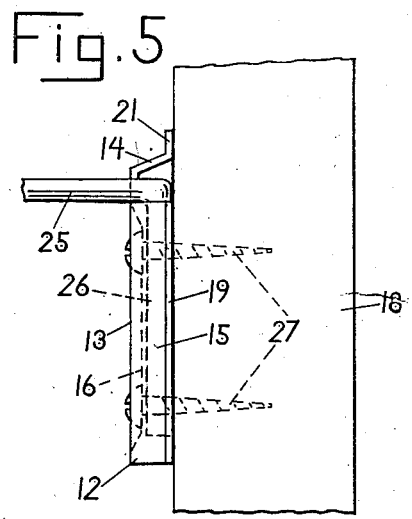
Fig. 5 shows a side view of a wall part and of parts of the same embodiment affixed to this wall in a manner different from the manner shown in Figs. 1 to 4.

A shield-shaped member 12 comprises a front wall 13, a top wall 14 and two lateral walls 15. The top and the lateral walls extend from the front wall to the rear side or, when the shield 12 is attached to the suspension member 4, toward the plate 7 whereby the shield 12 is hollow or has a cavity at its back side. A central area 16 of the front wall 13 may be recessed or pressed backwardly. Two openings 17 are provided in the area 16 whereby the shield 12 is adapted for the passage of screws or similar fasteners which may be used for affixing the shield immediately to a wall 18 as shown in Fig. 5.

The rear margins of the lateral walls 15 are bent outwardly and turn into rims 19 positioned substantially parallel to the front wall 13 and fitting the channels behind the ledges 8. The top wall 14 turns into an upwardly bent rim 21 which has an upper end positioned under a projection 22 struck out of the plate 7. The projection 22 forms a stop preventing upward movement of the shield 12 unless this projection is resiliently pressed backwardly into the opening 23 from which the projection 22 has been struck out.

A funnel-shaped basket 24 may be made in a well known manner of network and may be suspended on a ring 25 made of strong wire. Two prongs 26 are affixed to the ring 25 and extend from the ring's periphery in directions angular with respect to the adjoining parts of this periphery. The ring may have a gap positioned between the prongs 26. The prongs may be integral and suitably bent parts of the ring's wire. The circular plane of the ring is substantially horizontal. The prongs extend substantially vertically.

The lateral walls 15 of the shield 12 have gaps or recesses for the passage of the ring 25. These gaps may be situated immediately under the top wall 14 whereby the upper ends of the lateral walls are spaced from the top wall. The prongs 26 are confined in the cavity of the shield 12. For example, each prong may be placed behind the front wall 13 and between a lateral wall 15 and the recessed area 16.

The described support may be assembled in the following manner:

The prongs 26 are placed from the rear side into the cavity of the shield 12 with the adjoining parts of the ring 25 passing through the lateral gaps between the top wall 14 and the lateral walls 15. While the ring is held in this position, the shield 12 is inserted from above into the channels formed by the ledge 8, the rims 19 sliding down behind these ledges and reaching in laterally outward directions beyond the free edges 11 of the ledges. Shortly before the shield reaches its lowermost position, the top rim 21 snaps over the stop 22. The converging shape of the ledges prevents further downward movement of the shield. The suspension member 4 may be hooked over the door 1 either after or before the attachment of the shield 12.

In order to affix the ring to a wall that has no free upper edge or in order to affix the ring permanently to a wall, the described device may be used without the suspension member 4. In this case, the ring 25 is placed into the shield 12 in the same manner as described before. Then, the shield is placed before a wall 18 and is affixed to this wall by means of suitable fasteners, for example, head screws 27 passing through the openings 17. The heads of these screws are substantially concealed within the recess of the shield 12 situated before the area 16.

I desire it understood that my invention is not confined to the particular embodiment shown and described, the same being merely illustrative, and that my invention may be carried out in other ways without departing from the spirit of my invention as it is obvious that the particular embodiment shown and described is only one of the many that may be employed to attain the objects of my invention.

Having described the nature of my invention, what I claim and desire to protect by Letters Patent is:

1. A basket-ball basket support comprising a suspension member having a front plate, a hollow shield removably engaging said plate, having a front wall spaced from said plate and having lateral walls extending from said front wall toward said plate, said lateral walls having gaps, a basket ring passing through said gaps, and a prong affixed to said ring, positioned between said lateral walls and extending at an angle to said ring's periphery.

2. A basket-ball basket support comprising a suspension member having a front plate, a hollow shield removably engaging said plate, having a front wall spaced from said plate and having lateral walls extending from said front wall toward said plate, said lateral walls having gaps, a basket ring passing through said gaps, and a prong affixed to said ring, positioned between said lateral walls and extending at an angle to said ring's periphery, said shield having openings for the passage of fasteners whereby said shield, when disengaged from said suspension member, can be affixed to a wall.

3. A basket-ball basket support comprising a suspension member having a back, a top and a front plate connected in the shape of a reversed U, two ledges positioned before said front plate, each ledge having a longitudinal edge affixed to said front plate and having another free longitudinal edge, a hollow shield removably engaging said ledges, having a front wall spaced from said front plate and having lateral walls extending from said front wall toward said front plate, said lateral walls having gaps, a basket ring passing through said gaps, and two prongs affixed to said ring, positioned between said lateral walls and extending at an angle to said ring's periphery.

4. A basket-ball basket support comprising a suspension member having a front plate, two ledges positioned before said front plate, each ledge having a longitudinal edge affixed to said plate and having another free longitudinal edge facing the free edge of the other ledge, a hollow shield having a front wall spaced from said plate and having a top wall and two lateral walls extending from said wall toward said plate, lateral rims affixed to said lateral walls, contacting said plate and reaching behind said ledges beyond said free edges whereby said shield is removably connected to said plate, said lateral walls having upper ends spaced from said top wall whereby gaps are formed between said top wall and said lateral walls, a basket ring passing through said gaps, and two prongs affixed to said ring, positioned between said lateral walls and extending at an angle to said ring's periphery 5. A basket-ball basket support comprising a suspension member having a front plate, two ledges positioned before said front plate in downwardly converging directions, each ledge having a longitudinal edge affixed to said plate and having another free longitudinal edge facing the free edge of the other ledge, a hollow shield having a front wall spaced from said plate and having a top wall and two lateral walls extending from said front wall toward said plate, lateral rims affixed to said lateral walls, contacting said plate and reaching behind said ledges beyond said free edges whereby said shield is removably connected to said plate, said lateral walls having upper ends spaced from said top wall whereby gaps are formed between said top wall and said lateral walls, a basket ring passing through said gaps, and two prongs affixed to said ring, positioned between said lateral walls and extending at an angle to said ring's periphery.

6. A basket-ball basket support comprising a suspension member having a front plate, two ledges positioned before said front plate, each ledge having a longitudinal edge affixed to said plate and having another free longitudinal edge facing the free edge of the other ledge, a hollow shield having a front wall spaced from said plate and having a top wall and two lateral walls extending from said front wall toward said plate, lateral rims affixed to said lateral walls, contacting said plate and reaching behind said ledges beyond said free edges whereby said shield is removably connected to said plate, said ledges forming stops preventing downward movement of said rims, a stop member affixed to said plate, extending from the same in downwardly projecting direction and having a lower edge positioned over said top wall, said lateral walls having upper ends spaced from said top wall whereby gaps are formed between said top wall and said lateral walls, a basket ring passing through said gaps, and two prongs affixed to said ring, positioned between said lateral walls and extending at an angle to said ring's periphery.

HERBERT RUBIN.

No references cited.